United States Patent
Yeh et al.

(10) Patent No.: US 8,907,911 B2
(45) Date of Patent: Dec. 9, 2014

(54) CAPACITIVE TOUCH CONTROL SENSOR

(75) Inventors: Yu-Chou Yeh, Taoyuan County (TW);
Jui-Ming Ni, Taoyuan County (TW);
Ping-Hsu Lai, Taoyuan County (TW);
Hsiao-Shun Jan, Taoyuan County (TW);
Cheng-Hsiung Wu, Taoyuan County (TW)

(73) Assignee: J Touch Corporation, Taoyuan County (TW)

( * ) Notice: Subject to any disclaimer, the term of this patent is extended or adjusted under 35 U.S.C. 154(b) by 133 days.

(21) Appl. No.: 13/545,694

(22) Filed: Jul. 10, 2012

(65) Prior Publication Data

US 2014/0015789 A1 Jan. 16, 2014

(51) Int. Cl.
*G06F 3/041* (2006.01)

(52) U.S. Cl.
USPC ........... 345/173; 345/174; 345/205; 345/206; 178/18.01; 178/18.06; 178/18.09

(58) Field of Classification Search
USPC ............... 345/174, 173, 205, 206; 178/18.01, 178/18.06, 18.09
See application file for complete search history.

(56) References Cited

U.S. PATENT DOCUMENTS

2008/0036751 A1* 2/2008 Yamazaki ...................... 345/205
2008/0186288 A1* 8/2008 Chang ........................... 345/174
2008/0278415 A1* 11/2008 Itakura et al. ................... 345/60

FOREIGN PATENT DOCUMENTS

JP 2012-018516 A 1/2012

* cited by examiner

*Primary Examiner* — Shaheda Abdin
(74) *Attorney, Agent, or Firm* — Li & Cai Intellectual Property (USA) Office

(57) ABSTRACT

The present disclosure provides a capacitive touch control sensor, comprising a plurality of first electrodes, a plurality of first electrode wires, a plurality of second electrodes and a plurality of second electrode wires. The first and second electrodes are aligned at predetermined gaps. Each of the first electrode wires connects to one of the first electrode. Each of the second electrode wires connects to more than one of the second electrodes in a same column. Each of the plurality of second electrodes encloses one of the first electrodes by preset separation.

4 Claims, 2 Drawing Sheets

CAPACITIVE TOUCH CONTROL SENSOR

BACKGROUND

1. Technical Field

The present disclosure relates to a capacitive touch control sensor; in particular, to a single-layered capacitive touch control sensor.

2. Description of Related Art

FIG. 1 shows a top view of a conventional capacitive touch control sensor 1 having a multilayered structure that requires multiple fabrication processes. In a first fabrication process, a plurality rows of first axial electrode blocks 10, a plurality rows of first axial wires 11, and a plurality rows of separately and adjacently arranged second axial electrode blocks 12 are disposed on a substrate surface of the capacitive touch control sensor 1. The first axial wire 11 interconnects each row of the first axial electrode blocks 10 along a first axial direction, and the second axial electrode blocks 12 are separately interposed between each two adjacent rows of the first axial electrode bocks 10 on either side of the first axial wire 11, respectively. In a subsequent second fabrication process, an insulation layer 15 overlappingly disposed on the interconnecting portion of the first axial wire 11 between each two adjacent first axial electrode blocks 10. Then, in a third fabrication process, a plurality of metallic second axial wires 13 is disposed on top of the insulation layers 15 to interconnect each column of the second axial electrode blocks 12 along a second axial direction. The insulation layer 15 sandwiched between the first axial wire 11 and the second axial wire 13 provides electrical insulation that keeps the first and the second axial wires from shorting, thus constituting a touch control circuit pattern. As can be seen, the manufacture process of the conventional multilayer capacitive touch control sensor 1 is complex and the production cost is high. Furthermore, the first electrode wires 14 and the second electrode wires 16 respectively interconnecting the first and second axial electrode blocks 10, 12 are made of visibly non-transparent metal materials which occupy part of the touch control region, resulting in a smaller display area on the touch screen.

SUMMARY

The present disclosure provides a capacitive touch control sensor arrangement capable of overcoming existing issues in manufacture complexity and the high production cost.

According to one exemplary embodiment of the present disclosure, a capacitive touch control sensor is provided, which includes: a plurality of first electrodes aligned at predetermined interval, a plurality of first electrode wires, each of which links to a first electrode respectively, a plurality of second electrodes aligned at predetermined interval, a plurality of second electrode wires, each of which links to more than one of the second electrodes and each of the substantially C-shaped second electrodes encloses one of the substantially T-shaped first electrodes by preset space.

In order to further understand the present disclosure, the following embodiment is provided along with illustrations to facilitate the appreciation of the present disclosure; however, the appended drawings are merely provided for reference and illustration, without any intention to be used for limiting present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 1:
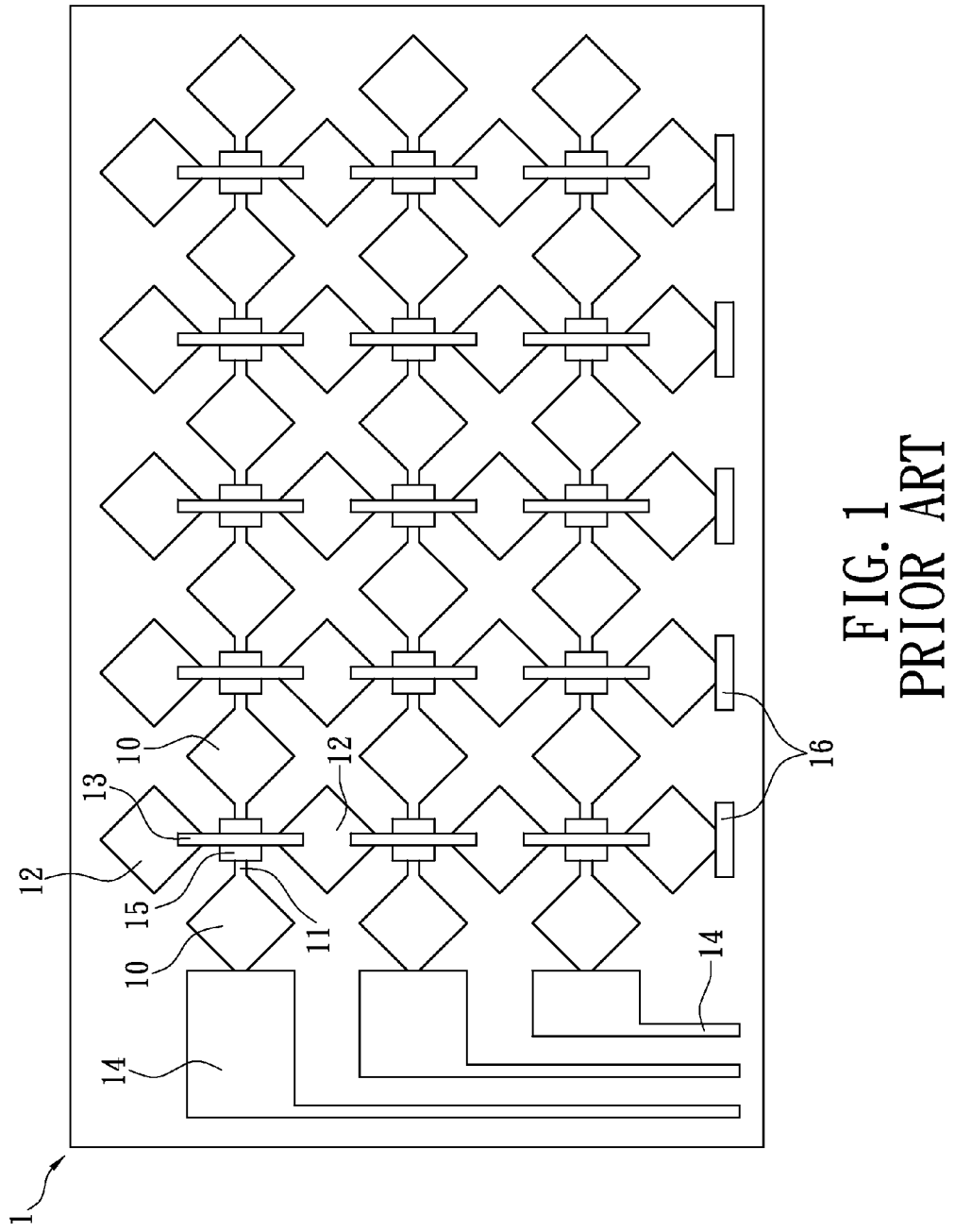
FIG. 1 schematically shows a top view of the electrode pattern of a conventional capacity touch control sensor.
Figure 2:
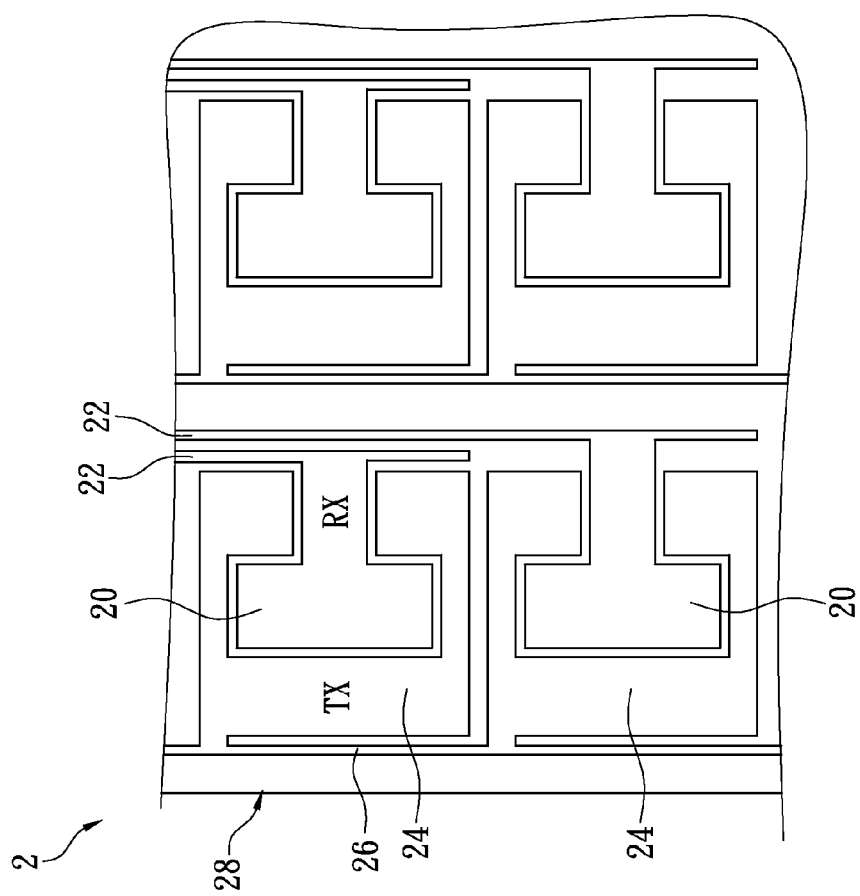
FIG. 2 shows an embodiment of a single-layered capacitive touch control sensor in accordance with the instant disclosure.

FIG. 2 illustrates an exemplary embodiment of the capacitive touch control sensor in accordance with the present disclosure. The capacitive touch control sensor 2 includes a plurality of first electrodes 20, a plurality of first electrode wires 22, a plurality of second electrodes 24, and a plurality of second electrode wires 26. The capacitive touch control sensor 2 may further comprise a transparent substrate 28 for hosting the first and second electrode wires 22, 26 together with the first and second electrodes 20, 24 thereon. The transparent substrate 28 can be made of materials selected from the following: glasses, polycarbonate (PC), polyester (PET), poly (methyl methacrylate) (PMMA), cyclic olefin copolymer (COC), and the combination thereof.

As shown in FIG. 2, each pair of the adjacent first electrodes 20 is arranged with a predetermined interval therebetween. Preferably, the top view shape of the first electrode 20 substantially resembles the letter "T". In addition, each of the first electrode wires 22 links to one of the first electrodes 20 respectively.

Also shown in FIG. 2, each pair of the adjacent second electrodes 24 is arranged with a predetermined interval therebetween in a manner similar to that of the first electrodes 20. Preferably, the top view shape of the second electrode 24 substantially resembles the letter C, where each of the C-shaped second electrodes 24 encloses one of the T-shaped first electrodes 20 by predetermined separation there-between. Moreover, a plurality of the second electrodes 24 in the same column are serially interconnected by a second electrode wire 26.

In the instant embodiment, the first electrode wire 22, the second electrode wire 26, the first electrode 20, and the second electrode 24 are preferably made of a transparent conductive material. Specifically, the transparent conductive material can be selected from the following: indium tin oxide (ITO), indium zinc oxide, aluminum doped zinc oxide, nanosilver, nanocopper, conductive polymer, carbon nanotube, graphene, silver bromide (AgBr), indium gallium zinc oxide (IGZO), and the combination thereof.

Because the capacitive touch control sensor 2 in accordance with the instant disclosure is a single-layered capacitive touch control sensor, the first and second electrode wires 22, 26, as well as the first and second electrodes 20, 24 can all be fabricated in a single process without the complexity that a conventional multi-layered structure requires. Therefore, the touch control sensor in accordance with the instant disclosure may achieve lower overall device profile and lower production cost.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. A capacitive touch control sensor, comprising:
a plurality of first electrodes aligned in a plurality of rows with predetermined gaps arranged there-between, wherein each of the first electrodes is substantially in a shape of "T";
a plurality of first electrode wires, wherein each of the first electrode wires connects one of the first electrodes;
a plurality of second electrodes aligned in a plurality of columns with predetermined gaps arranged there-between, wherein each of the second electrodes is substantially in a shape of "C", and each of the second electrodes encloses one of the first electrodes with a predetermined separation; and
a plurality of second electrode wires, wherein each of the second electrode wires connects more than one of the second electrodes in a same column;
wherein, the first electrodes, the first electrode wires serially, the second electrodes, and the second electrode wires are formed a single-layered capacitive touch control sensor in a single process.

2. The capacitive touch control sensor according to claim 1, wherein the first and second electrodes and the first and second electrode wires are made of a transparent conductive material.

3. The capacitive touch control sensor according to claim 2, wherein the transparent conductive material is selected from the group consisting of indium tin oxide (ITO), indium zinc oxide, aluminum doped zinc oxide, nanosilver, nanocopper, conductive polymer, carbon nanotube, graphene, silver bromide (AgBr), and indium gallium zinc oxide (IGZO).

4. The capacitive touch control sensor according to claim 1, further comprising: a transparent substrate, wherein the first and second electrodes and the first and second electrode wires are disposed on a surface of the transparent substrate.

* * * * *